US 9,854,944 B2

(12) United States Patent
Ohta et al.

(10) Patent No.: US 9,854,944 B2
(45) Date of Patent: Jan. 2, 2018

(54) COFFEE BEANS GRINDER

(71) Applicant: Zojirushi Corporation, Osaka-shi (JP)

(72) Inventors: Satoshi Ohta, Osaka (JP); Takuya Ishii, Osaka (JP); Kimihiro Kawano, Osaka (JP); Masatoshi Maekawa, Osaka (JP)

(73) Assignee: Zojirushi Corporation, Osaka (JP)

( * ) Notice: Subject to any disclaimer, the term of this patent is extended or adjusted under 35 U.S.C. 154(b) by 264 days.

(21) Appl. No.: 14/801,965

(22) Filed: Jul. 17, 2015

(65) Prior Publication Data
US 2016/0015215 A1    Jan. 21, 2016

(30) Foreign Application Priority Data
Jul. 17, 2014  (JP) ................................ 2014-147083

(51) Int. Cl.
*A47J 42/50*  (2006.01)
*A47J 42/02*  (2006.01)
*A47J 42/00*  (2006.01)

(52) U.S. Cl.
CPC .............. *A47J 42/50* (2013.01); *A47J 42/02* (2013.01); *A47J 42/00* (2013.01)

(58) Field of Classification Search
CPC ............. A47J 42/00; A47J 42/02; A47J 42/50
See application file for complete search history.

(56) References Cited

U.S. PATENT DOCUMENTS

| 2010/0170971 A1* | 7/2010 | Doglioni Majer ...... A47J 42/38 241/30 |
| 2011/0256273 A1* | 10/2011 | de Graaff ................ A47J 31/42 426/112 |
| 2012/0138721 A1* | 6/2012 | Hergesell ................ A47J 42/18 241/277 |

(Continued)

FOREIGN PATENT DOCUMENTS

| JP | 48-59779 U | 7/1973 |
| JP | 49-111075 U | 9/1974 |
| JP | 53-124382 U | 10/1978 |

(Continued)

OTHER PUBLICATIONS

English-language Translation of Notification of Reasons for Refusal, Japanese Patent Application No. 2014-147083, dated Jul. 18, 2017.

*Primary Examiner* — Faye Francis
(74) *Attorney, Agent, or Firm* — The Webb Law Firm (57) ABSTRACT

A coffee beans grinder includes a main body, a dispensing component, a blade unit for grinding coffee beans having a first blade element and a second blade element facing the first blade element, and a dispensing element provided in the dispensing component for feeding coffee beans to a grinding space defined between the first blade element and the second blade element. The first blade element is provided in the main body, and the second blade element is provided in the dispensing component. The dispensing component is removably attached to the main body with a manually-operable engagement element. The second blade element faces the (Continued)

first blade element to define the grinding space therebetween with the dispensing component being attached to the main body with the manually-operable engagement element.

2 Claims, 3 Drawing Sheets

(56) References Cited

U.S. PATENT DOCUMENTS

| 2013/0095219 A1* | 4/2013 | de Graaff | A47J 31/42 426/433 |
| 2014/0361107 A1* | 12/2014 | Steiner | A47J 31/42 241/253 |

FOREIGN PATENT DOCUMENTS

| JP | 62-93936 U | 1/1987 |
| JP | 420376 Y2 | 5/1992 |
| JP | 08-103383 A | 4/1996 |

* cited by examiner

COFFEE BEANS GRINDER

CROSS-REFERENCE TO RELATED APPLICATION

This application claims priority to Japanese Patent Application No. 2014-147083 filed Jul. 17, 2014, the disclosure of which is hereby incorporated in its entirety by reference.

TECHNICAL FILED OF INVENTION

The present invention relates to a coffee beans grinder including a blade unit for grinding coffee beans having a first blade element and a second blade element facing the first blade element, and a dispensing element for feeding beans to a grinding space defined between the first blade element and the second blade element.

RELATED ART OF INVENTION

A conventional example of the above coffee beans grinder is disclosed in Japanese Utility Model Publication No. 4-20376, which includes a male blade 8 provided in an outer tube 3, and a female blade 16 provided in an inner tube 5. A shaft 21 provided in the inner tube 5 is engaged with a head 25 from below the outer tube 3 through a washer 24 to connect the outer tube 3 and the inner tube 5. A spring 28 is provided between the inner tube 5 and the shaft 21 to resiliently urge the outer tube 3 and the inner tube 5 toward each other.

SUMMARY OF INVENTION

Technical Problem

The head 25 disclosed in the above Japanese Utility Model Publication is regarded as a screw head in view of the name and the shape. Thus, a tool or an implement may be necessary for connecting or disconnecting the outer tube 3 to or from the inner tube 5. Further, when attaching the removed head 25 to the shaft 21 again, the user is required to keep the shaft 21 pulled toward the outer tube 3 against the resilient force of the spring 28, which may prevent easy attachment or the detachment of the head 25. Thus, the user cannot manually disconnect the outer tube 3 from the inner tube 5 without using any tool and cannot easily access or clean the male blade 8 provided in the outer tube 3 or the female blade 16 provided in the inner tube 5.

Under the circumstances, a coffee beans grinder providing easy access to the blade unit for cleaning or maintenance has been desired.

Solution to Technical Problem

The present invention provides a coffee beans grinder including a main body, a dispensing component, a blade unit for grinding coffee beans having a first blade element and a second blade element facing the first blade element, and a dispensing element provided in the dispensing component for feeding coffee beans to a grinding space defined between the first blade element and the second blade element. The first blade element is provided in the main body, and the second blade element is provided in the dispensing component. The dispensing component is removably attached to the main body with a manually-operable engagement element. The second blade element faces the first blade element to define the grinding space therebetween with the dispensing component being attached to the main body with the manually-operable engagement element.

With the above arrangement, the dispensing component is easily attachable to or detachable from the main body by simple manual operation. Removal of the dispensing component from the main body allows the user to easily clean the second blade element and the dispensing element provided in the dispensing component. The first blade element provided in the main body is exposed with removal of the dispensing component as well as the second blade element and thus also easily cleaned.

The coffee beans grinder further includes an epidermis collector provided in the dispensing component for collecting epidermis from the coffee beans.

With the above arrangement, the epidermis collector can be removed together with the dispensing component from the main body to allow the user to clean the epidermis collector and the dispensing component together or remove the epidermis accumulated in the epidermis collector, which improves the convenience in maintenance.

Further, the first blade element has a conical shape tapered toward the dispensing component, the second blade element has a cylindrical shape surrounding the first blade element, the grinding space is defined by a tubular gap between an outer circumferential surface of the first blade element and an inner circumferential surface of the second blade element, and the dispensing component feeds the coffee beans to one open side of the tubular grinding space adjacent to the dispensing component.

With the above arrangement, the conical shape of the first blade element tapered toward the dispensing element allows the cylindrical second blade element to face the outer circumference of the first blade and be easily attached to or removed from the first blade element in attaching or detaching the dispensing component having the dispensing component to or from the main body. This arrangement results in a simple structure with increased strength and improved convenience for cleaning around the second blade element of the dispensing component.

DETAILED DESCRIPTION OF INVENTION

Referring now to the accompanying drawings, a coffee beans grinder 1 according to the present invention includes a blade unit for grinding coffee beans having a first blade element A and a second blade element B facing the first blade element A, and a dispensing element 7 for feeding beans to a grinding space 3 defined between the first blade element A and the second blade element B. Such a grinder 1 may be used as a typical coffee mill or assembled into a coffee maker.

The terms "upper" or "upward" and "lower" or "downward" are used in this disclosure with the grinder 1 being placed in a flat, horizontal surface. Thus, "vertical direction H" is defined as a direction perpendicular to the horizontal direction, and "axial direction X" as a direction extending along a rotation axis S of the blade unit. The rotation axis S extends in the vertical direction H. The terms "circumferential direction" and "radial direction" are used in reference to the rotation axis S. The axial direction X defines a first side X1 as an upper side in the vertical direction H, and a second side X2 as a lower side in the vertical direction H.

Figure 1:
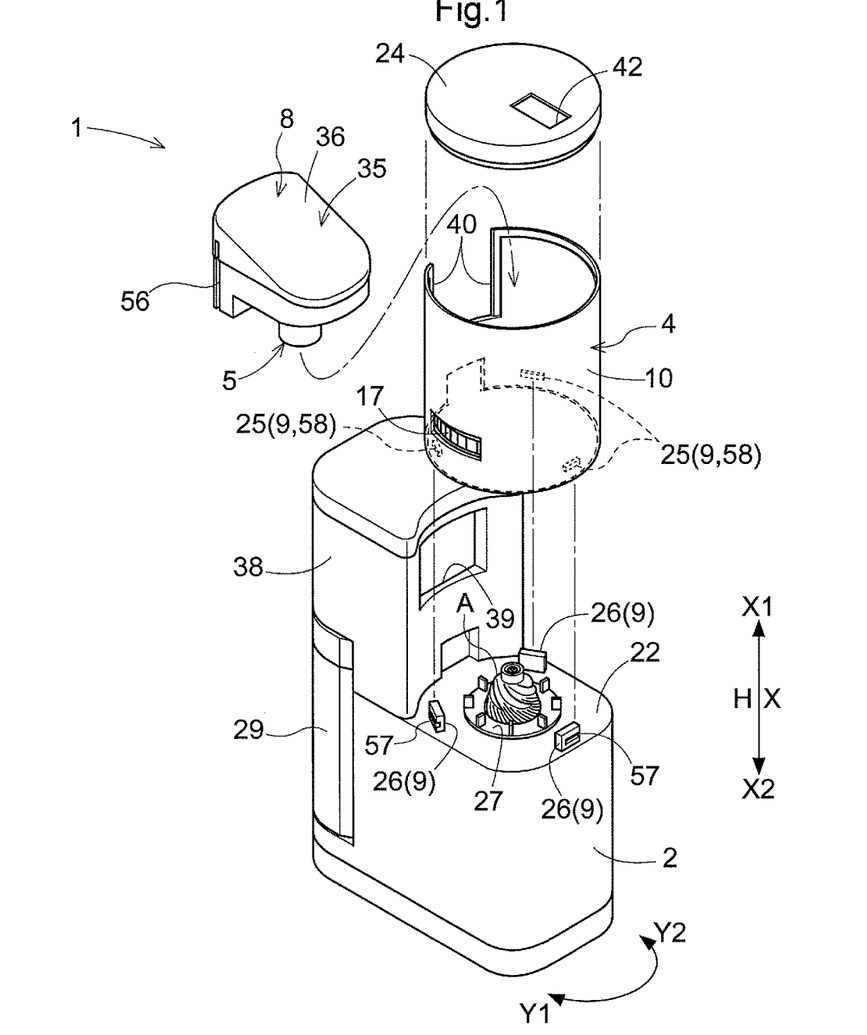
FIG. 1 is an exploded perspective view of a coffee beans grinder.
Figure 3:
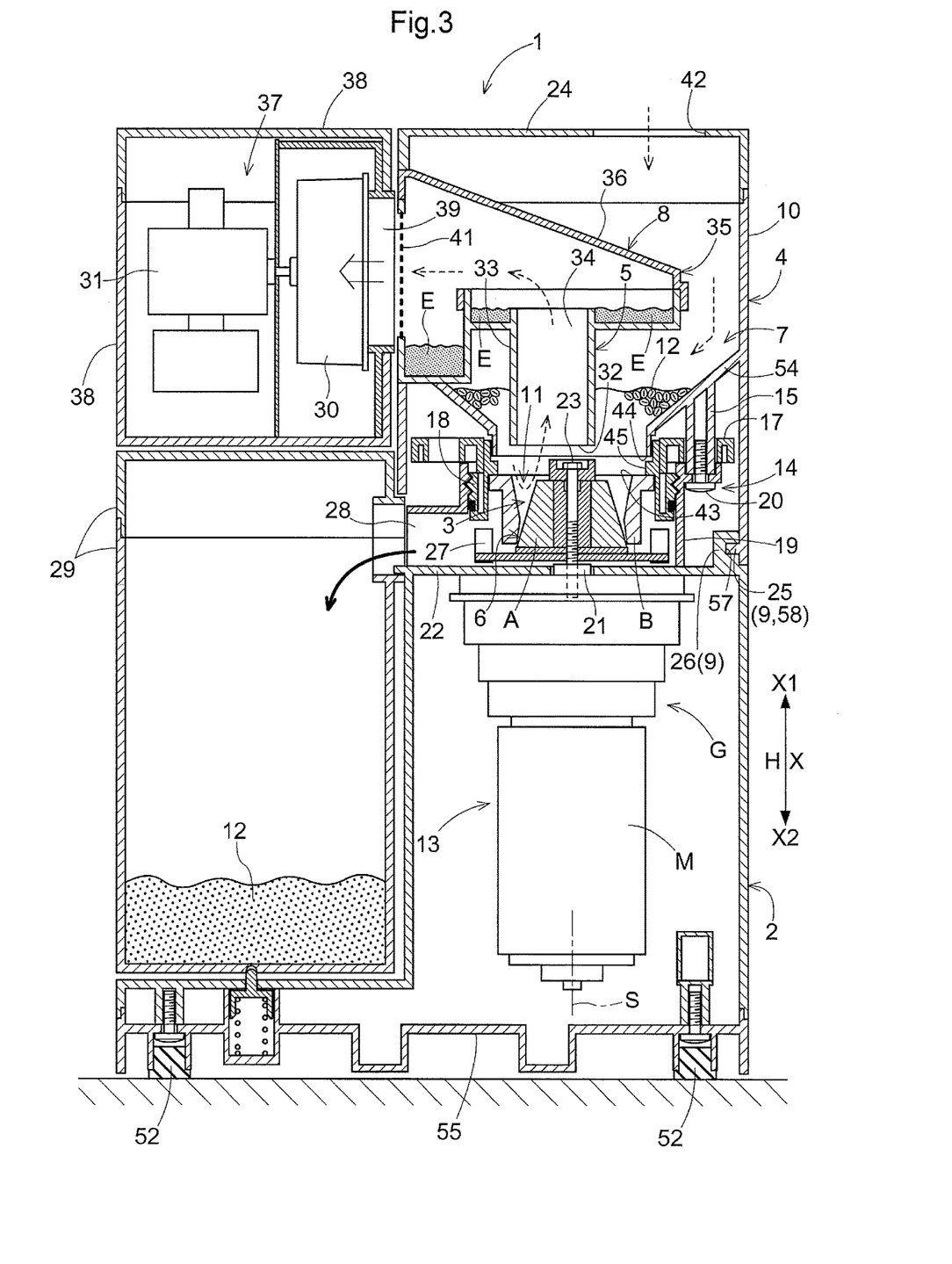
FIG. 3 is a vertical sectional view of the coffee beans grinder.

The grinder 1 further includes a main body 2, and a dispensing component 4 with the dispensing element 7. The first blade element A is provided in the main body 2 and the second blade element B is provided in the dispensing component 4. The main body 2 is a primary component of the grinder 1 including a driving unit 13 therein for rotating and driving the blade unit. The dispensing component 4, a ground coffee container 29, and a negative-pressure generating chamber 38 are attached to the main body 2. A portion of the main body 2 housing the driving unit 13 is a cylindrical portion extending substantially in the vertical direction H. In this disclosure, the main body 2 represents the cylindrical portion housing the driving unit 13 unless otherwise explained. The main body 2 has an upper end covered with an upper wall 22 extending in the horizontal direction. The first blade element A and the dispensing component 4 are provided above the upper wall 22. The driving unit 13 includes an output shaft 21 extending through the upper wall 22. The first blade element A is fixed to the output shaft 21 and is rotated about the rotation axis S by driving power of the driving unit 13. The first blade element A is provided outside, i.e., the upper side of the main body 2 and rotatably supported to the main body 2 by the output shaft 21 of the driving unit 13. The main body 2 has a lower end covered with a bottom wall 55. The bottom wall 55 has a plurality of legs 52, which are placed on a horizontal table, for example. The main body 2 further includes a plate portion extending sideways from the lower end of the cylindrical portion housing the driving unit 13. The ground coffee container 29 is placed above and attached to the plate portion.

The dispensing component 4 has a cylindrical circumferential wall 10 extending in the vertical direction H. The dispensing element 7 is defined within the dispensing component 4. The circumferential wall 10 has a center coinciding with the rotation axis S. The dispensing element 7 is configured to feed coffee beans to be ground to the grinding space 3. The dispensing element 7 has a funneled portion ("hopper" hereinafter) 54 tapered toward the blade unit, i.e., downward. The hopper 54 is formed integrally with and fixed to the circumferential wall 10 at a vertically intermediate position (to be more specific, slightly lower than the middle point) of the circumferential wall 10, extending radially inward and downward from the circumferential wall 10. An upper and radially inner portion of the hopper 54 within the dispensing component 4 acts as the dispensing element 7 for storing coffee beans 12 dispensed by the user. The second blade element B and a gap adjustor 14 are fixed to the hopper 54 in a lower portion of the dispensing component 4. The dispensing component 4 has an upper opening covered with a dispenser lid 24 that is removable when the user refills the dispensing element 7 with coffee beans.

A plurality of blades are formed in each of the opposing surfaces of the first and second blade elements A and B. The beans are ground in the grinding space 3 as the first blade element A and the second blade element B move relatively with each other. The first blade element A faces the second blade element B to define the grinding space 3 with the dispensing component 4 being attached to the main body 2 through a manually-operable engagement unit 9. A feeding area 11 for feeding beans from the dispensing element 7 to the grinding space 3 is defined at one side of the grinding space 3 in the vertical direction, and a discharge area 6 for discharging the ground coffee to the outside of the grinding space 3 is defined at the other side of the grinding space 3 in the vertical direction. The dispensing element 7 is provided outside of the feeding area 11 to communicate with the feeding area 11. The beans fed to the grinding space 3 are ground with the relative movement between the first blade element A and the second blade element B, moved in the grinding space 13 from the feeding area 11 to the discharge area 6, and then discharged from the discharge area 6.

The first blade element A has a cylindrical shape extending in the circumferential direction of the rotation axis S and the axial direction X. The second blade element B also has a cylindrical shape extending in the circumferential direction of the rotation axis S and the axial direction X to surround the first blade element A. An outer circumferential surface of the first blade element A faces an inner circumferential surface of the second blade element B. The outer circumferential surface of the first blade element A has a plurality of spirally extending blades, and the inner circumferential surface of the second blade element B has a plurality of spirally extending blades. The cylindrical space defined between the outer circumferential surface of the first blade element A and the inner circumferential surface of the second blade element B acts as the grinding space 3. The dispensing element 7 is configured to feed beans to the cylindrical grinding space 3 from the upper side. The cylindrical grinding space 3 extends in the axial direction X, i.e., vertical direction H. The feeding area 11 is an end opening defined at one side, i.e., the upper side or the first side X1 of the axial direction in the grinding space 3 adjacent to the dispensing element 7, and the discharge area 6 is an end opening defined at the opposite side of the feeding area 11, i.e., the lower side or the second side X2 of the axial direction in the grinding space 3. The dispensing element 7 is provided in the first side X1, i.e., the upper side of the axial direction above the feeding area 11 in the grinding space 3. The beans fed to the grinding space 3 are ground with the relative movement between the first blade element A and the second blade element B, moved in the grinding space 13 toward the second side X2, i.e., the lower side of the axial direction, and then discharged from the discharge area 6.

The gap between the two blade elements A and B gradually becomes narrower in the vertical direction from the dispensing element 7 to the discharge area 6. The first blade element A has a conical shape tapered toward the dispensing element 7, i.e., toward the first side X1, i.e., the upper side of the axial direction. The centerline of the cone coincides with the rotation axis S. The second blade element B gradually decreases its inner diameter in the vertical direction from the first side X1 of the axial direction, i.e., the upper end adjacent to the dispensing element 7 toward an intermediate portion of the second blade element B between the end adjacent to the dispensing element 7 and the end adjacent to the discharge area 6, and then gradually increases its inner diameter toward the second side X2 of the axial direction, i.e., the lower end adjacent to the discharge area 6. The conical shape of the first blade element A tapered toward the dispensing element 7 allows the cylindrical second blade element B to face the outer circumference of the first blade element A to be easily attached to or removed from the first blade element A in attaching or removing the dispensing component 4 having the dispensing element 7 to or from the main body 2.

The dispensing element 7 is connected at an open end 43 of the cylindrical second blade element B adjacent to the dispensing element 7. With such an arrangement, it is only required that the cylindrical second blade element B is connected to the dispensing element 7 to position the first blade element A radially inward of the second blade element B to form a beans feeding path and the grinding space 3. This arrangement results in a simple structure with increased strength around the dispensing element 7 and the second blade element B of the dispensing component 4. The tubular space defined radially inward of the second blade element B communicates with the inner space of the dispensing element 7 to define a continuous space to allow the user to easily clean the dispensing element 7 and the second blade element B of the dispensing component 4 when removing the first blade element A from the second blade element B for cleaning and maintenance.

The hopper 54 forming the dispensing element 7 has a circular open end 44 adjacent to the second blade element B, i.e., at the lower side or the second side X2 of the axial direction. The circular open end 44 is connected to the circular open end 43 of the second blade element B adjacent to the dispensing element 7, i.e., at the upper side or the first side X1 of the axial direction through an inner circumferential surface 45 of a cylindrical support element 18 for supporting the second blade element B from the outside.

The ground coffee discharged from the discharge area 6 defined between the two blade elements A and B is propelled to a release passage 28 defined by the upper wall 22 and a side wall 19 by rotation of a rotary blade 27 and guided to the ground coffee container 29 through the release passage 28 and an opening of the container 29. The ground coffee container 29 is cylindrical for storing the ground coffee and is removably attached to a side of the main body 2.

The driving unit 13 includes an electric motor M, and reduction gearing G for reducing rotation speed of the electric motor M to transmit the power to the output shaft 21. The electric motor M and the reduction gearing G are fixed in the main body 2 to be disposed coaxially with the rotation axis S. The output shaft 21 of the driving unit 13 or the reduction gearing G extends through the upper wall 22 in the vertical direction H. The first blade element A is fixed to the output shaft 21 to be rotatable in unison through a fastening element 23 such as a bolt. The rotary blade 27 is provided between the first blade element A and the upper wall 22 to be rotatable in unison with the first blade element A. A control switch (not shown) operable by the user for energizing the electric motor M is provided in a side surface of the main body 2.

The gap adjustor 14 is provided in the dispensing component 4 to adjust the gap between the first blade element A and the second blade element B for selecting the fineness of the ground coffee discharged from the discharge area 6. The second blade element B is fixed to the dispensing component 4 through the gap adjustor 14. The gap adjustor 14 is configured to move the second blade element B relative to the dispensing component 4 toward the first side X1 or the second side X2 of the axial direction to vary the gap between the first blade element A and the second blade element B. The gap adjustor 14 has the cylindrical support element 18 for supporting and fixing the second blade element B from the outside, and an adjustment ring 17 rotatable in unison with the support element 18. Part of the adjustment ring 17 is exposed to the outside from an opening formed in the dispensing component 4 to be rotatable by the user (see FIG. 1). The cylindrical side wall 19 is provided radially outward of the support element 18, and is fixed to the dispensing component 4 or to a cylindrical support rod 15 extending downward from the hopper 54 via a fastening element 20 such as a screw. The support element 18 has a male screw formed in its outer circumference and engaged with a female screw formed in an inner circumference of the side wall 19, thereby to form a feed screw mechanism together to allow the support element 18 to rotate and move in the axial direction relative to the side wall 19 with rotation of the adjustment ring 17. As described above, the second blade element B is fixed to the dispensing component 4 through the feed screw mechanism including the support element 18 and the side wall 19.

The dispensing component 4 includes an epidermis collector 8 for collecting epidermis from the ground coffee. The epidermis remains around center cuts of roasted beans, and is removed from the beans in grinding operation. The epidermis is also called silverskin, which is thin, light, white skin like a feather of an insect. Some users prefer removing the epidermis from the ground coffee because it would affect the taste of coffee and look like foreign matter. The epidermis collector 8 includes at least one of an intake element for drawing air from the side of the blade unit and a blowoff element for directing air toward the blade unit, which are provided in a zone extending from the discharge area 6 toward the dispensing element 7. In the current embodiment, the epidermis collector 8 includes only the intake element 5 and dispenses with the blowoff element, and further includes a collecting container 35 for storing at least epidermis of the ground coffee. More particularly, the intake element or the blowoff element is provided in a region or portion extending from the discharge area 6 toward the dispensing element 7 in a beans transfer path extending from the dispensing element 7 to the discharge area 6 and a connecting area continuous from the beans transfer path. The intake element has at least an inlet for drawing air from the side of the blade unit, and the blowoff element has at least one of an outlet for directing air toward the blade unit and a blower for propelling air directly to the blade unit. When the epidermis collector 8 includes the intake element, at least the inlet of the intake element is provided in the dispensing component 4. When the epidermis collector 8 includes the blowoff element, at least the outlet or the blower of the blowoff element is provided in the dispensing component 4. The ground coffee is coarser in the zone extending from the discharge area 6 toward the dispensing element 7 than the completely ground coffee discharged from the discharge area 6. Thus, in the zone where the ground coffee is still coarse, the weight of a piece or fragment of epidermis is lighter than the weight of a piece or fragment of partly ground bean. With the above arrangement, the epidermis can be removed from the coffee or partly ground beans more easily to be collected to the epidermis collector 8 than with an arrangement for drawing or blowing air to the completely ground coffee discharged from the discharge area 6. This facilitates the collection of epidermis even when the finely-ground coffee is discharged from the discharge area 6.

The epidermis collector 8 is provided in the dispensing element 7, and more particularly, inside the dispensing component 4 above the hopper 54. The epidermis collector 8 is detachably fitted on a cutout 40 formed in the circumferential wall 10 of the dispensing component 4. The cutout 40 is rectangular and extended in the vertical direction H, opening upward. The collecting container 35 has engaging grooves 56 formed in circumferential opposite side walls and extending in the vertical direction H. The grooves 56 are fitted on engaging projections formed in the cutout 40 and extending in the vertical direction H from above. Thus, the epidermis collector 8 can be removed together with the dispensing component 4 from the main body 2 to allow the user to clean the epidermis collector 8 and the dispensing component 4 together or remove the epidermis accumulated in the epidermis collector 8, which improves the convenience in maintenance.

The intake element 5 includes an intake tube 33 having a lower end opening at an inlet 32 adjacent to the blade unit for drawing air from the side of the blade unit, the inlet being provided within the dispensing element 7. The intake tube 33 extends at least in the vertical direction H. The inlet 32 is positioned adjacent to the dispensing element 7 and spaced from the two blade elements A and B at a predetermined interval. A force generated by an upward air flow from the intake element 5 allows rising of the epidermis having a relatively small weight in the intake tube 33, and the gravity prevents rising of the partly ground coffee having a relatively large weight. The collecting container 35 is connected to the intake element 5 at a discharge opening 34 opposite the inlet 32 of the intake tube 33 for collecting the epidermis E entrained with air drawn and guided from the intake element 5. The collecting container 35 is integrally formed with the intake tube 33 to be housed in the dispensing component 4 or the dispensing area 7. The collecting container 35 has a removable collector lid 36.

The dispenser lid 24 has an opening 42, from which large part of air drawn by the intake element 5 is supplied. The air supplied from the opening 42 flows in the dispensing element 7 toward the intake element 5, which then is drawn from the inlet 32. In this time, air from the grinding space 3 is also drawn from the inlet 32 together with the epidermis owing to negative pressure generated around the inlet 32.

The grinder 1 further includes a negative-pressure generating section 37 for generating negative pressure for drawing air. The negative-pressure generating section 37 includes a suction fan 30 and a fan motor 31 for rotating and driving the suction fan 30. The negative-pressure generating section 37 is provided outside the dispensing component 4 and defined within the negative-pressure generating chamber 38 fixed to a diagonally upper portion of the main body 2 for transmitting negative pressure to the intake element 5 through the collecting container 35. The negative-pressure generating chamber 38 has an opening 39 formed in its side wall adjacent to the dispensing component 4 for transmitting negative pressure generated at the negative-pressure generating section 37 to the collecting container 35. The collecting container 35 has an opening 41 formed in its side wall at a portion aligned with the cutout 40 of the dispensing component 4. The opening 41 of the collecting container 35 is aligned with or opposed to the opening 39 of the negative-pressure generating chamber 38 to communicate with each other. The air is drawn from the collecting container 35 to the negative-pressure generating section 37 through the two openings 41 and 39. A reticulate filter is attached to the opening 41 of the collecting container 35 for filtering the drawn air to allow the epidermis to remain in the collecting container 35 to be accumulated and collected there. A control switch (not shown) operable by the user for energizing the fan motor 31 is provided in a side surface of the main body 2 to be operated with the control switch for the electric motor M. More particularly, when the control switch for the electric motor M is turned on with the control switch for the fan motor 31 being ON, the fan motor 31 is energized. Meanwhile, when the control switch for the electric motor M is turned off with the control switch for the fan motor 31 being ON, the fan motor 31 is de-energized. On the other hand, when the control switch for the fan motor 31 is turned off, the fan motor 31 is always de-energized regardless of whether the control switch for the electric motor M is ON or OFF. The control switch for the fan motor 31 may be dispensable to energize both the electric motor M and the fan motor 31 when the control switch for the electric motor M is turned on and de-energize both the electric motor M and the fan motor 31 when the control switch for the electric motor M is turned off.

Figure 2:
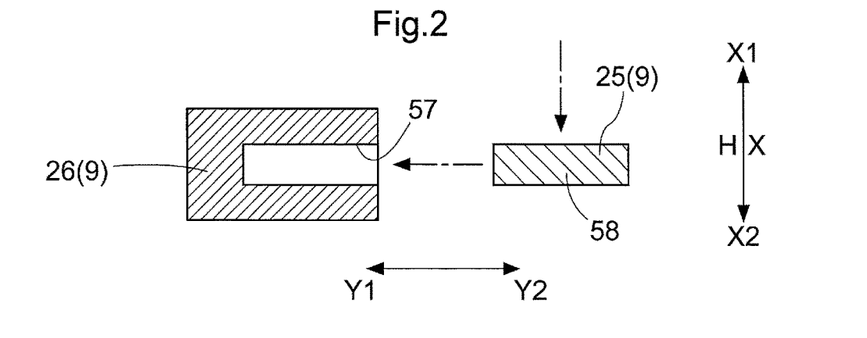
FIG. 2 is a schematic view of a manually-operable engagement element.

The dispensing component 4 is removably attached to the main body 2 through the manually-operable engagement unit 9, which is operable by hand without using any separate tool or instrument other than the grinder components. The manually-operable engagement unit 9 has a bayonet-mount mechanism to allow a device to rotate and engage with another device by manual operation. The manually-operable engagement unit 9 includes an engaging element 25 formed in a lower end portion of the dispensing component 4, and an engageable element 26 formed on the upper wall 22 of the main body 2. The user places the dispensing component 4 on the upper wall 22 of the main body 2 and then rotates the dispensing component 4 to a first side Y1 of the circumferential direction to engage the engaging element 25 with the engageable element 26, thereby to fix the dispensing component 4 to the main body 2. Conversely, the user rotates the dispensing component 4 to a second side Y1 of the circumferential direction with the engaging element 25 being engaged with the engageable element 26 to disengage the engaging element 25 from the engageable element 26, thereby to remove the dispensing component 4 from the main body 2.

A plurality of engageable elements 26 projecting upward from the upper wall 22 by a predetermined amount are provided radially outward of the first blade element A in the circumferential direction to form a circular arc. In the current embodiment, three engageable elements 26 are disposed in the circumferential direction at regular intervals. The engageable elements 26 have outer surfaces fitted to an inner surface of the circumferential wall 10 of the dispensing component 4 to position the dispensing component 4 relative to the main body 2 in the radial direction and align the second blade element B with the rotation axis S. A receiving groove 57 is formed in the outer surface of each of the engageable elements 26 to extend in the circumferential direction and concave radially inward. The receiving groove 57 opens at a second side Y2 of the circumferential direction. The engaging portion 25 is formed as a projection 58 provided in the inner surface of the circumferential wall 10 of the dispensing component 4 at a position corresponding to the receiving groove 57 of the engageable element 26 to extend in the circumferential direction and protrude radially inward. The projection 58 is shaped to fit into the receiving groove 57.

The user places the dispensing component 4 on the upper wall 22 of the main body 2 to allow the inner surface of the dispensing component 4 to fit to the outer surfaces of the engageable elements 26 and then rotates the dispensing component 4 to the first side Y1 of the circumferential direction to engage the projections 58 with the receiving grooves 57, thereby to position the dispensing component 4 relative to the main body 2 in the vertical direction H and the radial direction. As a result, the dispensing component 4 is fixed to the main body 2. Conversely, the user rotates the dispensing component 4 to the second side Y2 of the circumferential direction with the projections 58 being engaged with the receiving grooves 57 to disengage the projections 58 from the receiving grooves 57, thereby to remove the dispensing component 4 upward from the main body 2.

Removal of the dispensing component 4 from the main body 2 allows the user to easily clean the second blade element B, the dispensing element 7, and the epidermis collector 8 provided in the dispensing component 4. The first blade element A provided in the main body 2 is exposed with removal of the dispensing component 4, and thus also easily cleaned.

The dispensing component 4 is easily rotated in the circumferential direction to the engaged position because its outer wall is shaped cylindrical to center on the rotation axis S. The negative-pressure chamber 38 provided in the side of the dispensing component 4 has an arc side wall adjacent to the dispensing component 4 to extend along the cylindrical outer wall of the dispensing component 4. This allows the opening 39 formed in the side wall of the negative-pressure chamber 38 to be positioned close to the opening 41 formed in the collecting container 35 to allow communication between the openings.

Alternative Embodiments

Although the present invention has been disclosed and illustrated with a certain degree of particularity, it is understood that the present disclosure has been made only by way of example, and that other modifications can be made to the disclosed apparatus without departing from the spirit and scope of the invention. The following describes some alternative embodiments.

Figure 4:
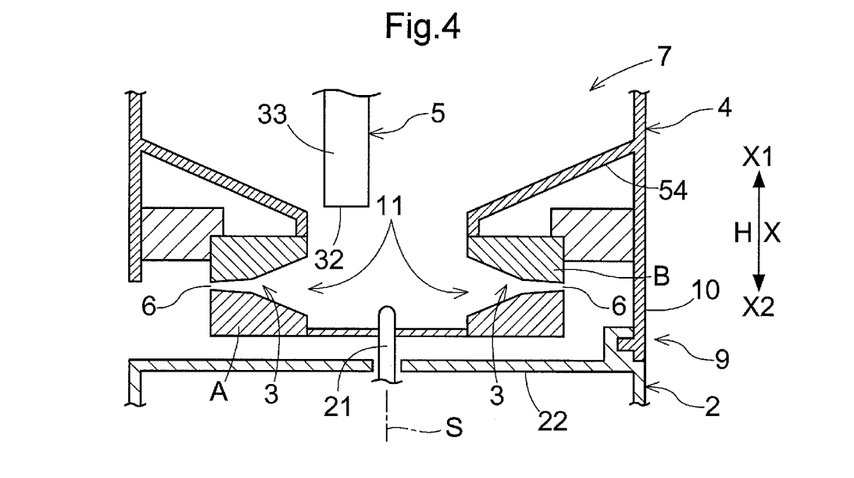
FIG. 4 is a schematic vertical sectional view of a principal portion of the grinder according to a modification.

[1] In the above embodiment, the blade unit includes the cylindrical first blade element A and the cylindrical second blade element B surrounding the first blade element A. Instead, the first and second blade elements A and B may be shaped otherwise if only they face each other. For example, as shown in FIG. 4, the blade unit may include a circular first blade element A and a circular second blade element B disposed above the first blade element A at the first side X1 of the axial direction. Similarly to the above embodiment, the first blade element A is provided in the main body 2, the second blade element B is provided in the dispensing component 4, and the dispensing component 4 is removably attached to the main body 2 through the manually-operable engagement unit 9. While the first blade element A is fixed to the output shaft 21 of the driving unit 13 to be rotatable about the rotation axis S by the driving power of the electric motor M, the second blade element B is fixed to the dispensing component 4. A plurality of blades are formed in each of the opposing surfaces of the first and second blade elements A and B. An annular gap defined between the first blade element A and the second blade element B acts as the grinding space 3. While the discharge area 6 is defined radially outward of the annular grinding space 3 for discharging the ground coffee to the outside, the feeding area 11 is defined radially inward of the annular grinding space 3 for feeding coffee beans from the dispensing element 7 to the grinding space 3. Similarly to the above embodiment, the grinder 1 may include the epidermis collector 8 that in turn may be provided in the dispensing component 4. Further, the grinder 1 may include the gap adjustor 14 that in turn may be provided in the dispensing component 4.

Alternatively, the second blade element B may be conical to taper toward the main body 2, and first blade element A may be cylindrical to surround the second blade element B. Similarly to the above embodiment, the first blade element A is provided in the main body 2, the second blade element B is provided in the dispensing component 4, and the dispensing component 4 is removably attached to the main body 2 through the manually-operable engagement unit 9. While the first blade element A may be fixed to the output shaft 21 of the driving unit 13 provided in the main body 2, the second blade element B may be fixed to the dispensing component 4.

Figure 5:
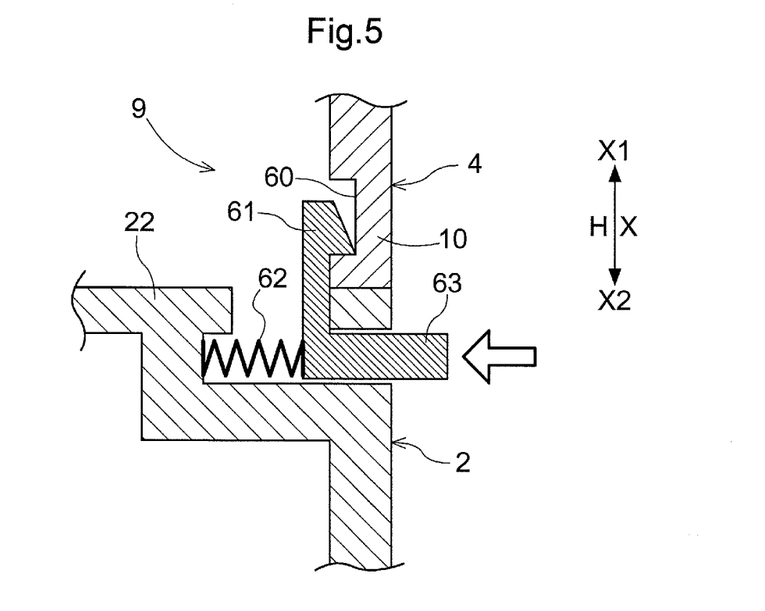
FIG. 5 is a schematic vertical sectional view of a principal portion of the grinder according to a modification.

[2] In the above embodiment, the manually-operable engagement unit 9 has the bayonet-mount mechanism. Instead, the manually-operable engagement unit 9 may have any other mounting mechanism if only the dispensing component 4 is manually and removably attached to the main body 2. For example, as shown in FIG. 5, the manually-operable engagement unit 9 may have a snap-mount mechanism. An engageable recess 60 is formed in the inner surface of the circumferential wall 10 of the dispensing component 4 to concave radially outward. An engaging pawl 61 is held on the main body 2 and engaged with the engageable recess 60 to fix the dispensing component 4 to the main body 2. The engaging pawl 61 is housed in a cavity formed in the upper wall 22 of the main body 2 to be movable in the cavity between an engaging position for engagement with the engageable recess 60 and a disengaging position for disengagement from the engageable recess 60. The engaging pawl 61 is urged to the engaging position by a resilient element 62 such as a spring. The user pushes an operable portion 63 of the engaging pawl 61 with a finger to move the engaging pawl 61 from the engaging position to the disengaging position. As a result, the engaging pawl 61 is disengaged from the engageable recess 60 to remove the dispensing component 4 from the main body 2.

[3] In the above embodiment, the epidermis collector 8 has only the intake element 5 and dispenses with the blowoff element. Alternatively, the epidermis collector 8 may have only the blowoff element and dispense with the intake element because it is only required that the epidermis collector 8 have at least one of the intake element and the blowoff element, which are provided in the region near the dispensing element 7 away from the discharge area 6. For example, the negative-pressure generating section 37 including the suction fan 30 and the fan motor 31 is dispensable. Instead, a blower may be provided in the opening 42 of the dispenser lid 24, for example, for introducing air into the dispensing element 7 from the outside of the grinder 1 to direct the air toward the blade unit through the dispensing element 7 and guide the air to the intake tube 33 through the inlet 32. In that case, while the blower acts as the blowoff element, the inlet 32 and the intake tube 33 do not act as the intake element.

[4] In the above embodiment, at least one of the intake element and the blowoff element is disposed within the dispensing element 7. Instead, at least one of the intake element and the blowoff element may be provided in any portion extending from the discharge area 6 toward the dispensing element 7. For example, at least one of the intake element and the blowoff element may be provided in a portion around the blade unit extending from the discharge area 6 toward the dispensing element 7. Alternatively, the inlet of the intake element or the outlet of the blowoff element may extend to the grinding space 3 between the first blade element A and the second blade element B or may open to the blade surface of the first blade element A or the second blade element B. In that case, at least one of the intake element and the blowoff element is provided in the dispensing component 4.

[5] In the above embodiment, the rotation axis S of the blade unit extends in the vertical direction H. Instead, the rotation axis S may lean from the vertical direction H, and may extend in the horizontal direction, for example.

[6] In the above embodiment, the grinder 1 includes the epidermis collector 8 that is provided in the dispensing component 4. Alternatively, the epidermis collector 8 is dispensable or may be partly or entirely provided outside the dispensing component 4.

[7] In the above embodiment, the negative-pressure generating section 37 is provided outside the dispensing component 4. Alternatively, the negative-pressure generating section 37 including the suction fan 30 and the fan motor 31 may be provided in the dispensing component 4.

[8] In the above embodiment, the grinder 1 includes the gap adjustor 14 that is disposed in the dispensing component 4. Alternatively, the gap adjustor 14 is dispensable or may be partly or entirely provided outside the dispensing component 4.

INDUSTRIAL USABILITY

The present invention is preferably applicable to a coffee beans grinder including a blade unit for grinding coffee beans with a first blade element and a second blade element facing the first blade element, and a dispensing element for feeding coffee beans to a grinding space defined between the first blade element and the second blade element.

What is claimed is:
1. A coffee beans grinder comprising:
a main body;
a dispensing component comprising an epidermis collector for collecting epidermis from the coffee beans;
a blade unit for grinding coffee beans having a first blade element and a second blade element facing the first blade element; and
a dispensing element provided in the dispensing component for feeding coffee beans to a grinding space defined between the first blade element and the second blade element;
wherein the first blade element is provided in the main body, and the second blade element is provided in the dispensing component,
the dispensing component is removably attached to the main body with a manually-operable engagement element, and
the second blade element faces the first blade element to define the grinding space therebetween with the dispensing component being attached to the main body with the manually-operable engagement element.

2. The coffee beans grinder according to claim 1, wherein the first blade element has a conical shape tapered toward the dispensing component,
the second blade element has a cylindrical shape surrounding the first blade element,
the grinding space is defined by a tubular gap between an outer circumferential surface of the first blade element and an inner circumferential surface of the second blade element, and
the dispensing component feeds the coffee beans to one open side of the tubular grinding space adjacent to the dispensing component.

\* \* \* \* \*